United States Patent
Hartman et al.

[11] Patent Number: 6,019,833
[45] Date of Patent: Feb. 1, 2000

[54] LIGHT COLORED CONDUCTIVE COATING AND METHOD AND COMPOSITION FOR APPLICATION THEREOF

[75] Inventors: Marvis E. Hartman, Pittsburgh, Pa.; Massimo P. Rei, Alessandria; Michela Castagnone, Trino Vercellese, both of Italy; Steven A. Hamay, Evans City, Pa.

[73] Assignee: PPG Industries Ohio, Inc., Cleveland, Ohio

[21] Appl. No.: 07/600,799

[22] Filed: Oct. 22, 1990

[51] Int. Cl.⁷ .................................. H01B 1/20; H01B 1/24
[52] U.S. Cl. .................. 106/476; 252/502; 252/510; 252/506; 106/499
[58] Field of Search .................. 252/511, 502, 252/510, 506; 106/476, 499

[56] References Cited

U.S. PATENT DOCUMENTS

| | | | |
|---|---|---|---|
| 4,606,848 | 8/1986 | Bond | 252/511 |
| 4,663,230 | 5/1987 | Tennent | 427/216 |
| 4,863,988 | 9/1989 | Inagaki et al. | 524/315 |
| 4,923,637 | 5/1990 | Yagi et al. | 252/511 |
| 5,066,422 | 11/1991 | Felter et al. | 252/511 |
| 5,068,061 | 11/1991 | Knobel et al. | 252/511 |
| 5,098,771 | 3/1992 | Friend | 428/209 |

FOREIGN PATENT DOCUMENTS

| | | |
|---|---|---|
| 79589 | 5/1983 | European Pat. Off. |
| 3420968 | 12/1985 | Germany |
| WO 91/01621 | 2/1991 | WIPO |

*Primary Examiner*—C. Melissa Koslow
*Attorney, Agent, or Firm*—Kenneth J. Stachel; William J. Uhl

[57] ABSTRACT

A conductive primer coating composition comprising a resinous film forming binder, a fibrous, carbonaceous material and a light colored pigment. This coating composition may be applied to plastic or other substrates having low electrical conductivity to form a light colored, conductive coating. The application of this first coating and subsequent coatings by the electrostatic method of application is facilitated.

15 Claims, No Drawings

— 6,019,833 —

LIGHT COLORED CONDUCTIVE COATING AND METHOD AND COMPOSITION FOR APPLICATION THEREOF

BACKGROUND OF THE INVENTION

1. Field of the Invention

The present invention relates to coatings and coating compositions and more particularly to coating compositions for use on plastics and other low conductivity substrates and to methods for their application.

2. Brief Description of the Prior Art

The use of parts formed from sheet molding compound (SMC) and other plastics in automobile bodies presents a number of advantages such as light weight and resistance to corrosion. One problem with the use of such parts, however, is that they are more difficult than metal to electrostatically spray paint. This difficulty is at least in part attributable to the fact that static electricity which develops as a result of the use of electrostatic spraying equipment can not be easily dissipated through the nonconductive parts. In order to solve this problem and impart conductivity to such parts it has been the practice to initially paint the parts with a primer which is rendered conductive by means of relatively large amounts of conductive carbon black in its composition. Such primers, however, have a resultant disadvantage in that they tend to be black or very dark gray in color. It may, therefore, be difficult to obtain good finishing coat hiding of the primer color.

SUMMARY OF THE INVENTION

The coating composition of the present invention is a coating composition for use on plastic substrates which is made up of a resinous film forming binder, a quantity of fibrous, carbonaceous material and a white and/or other light colored pigment. The fibers in the fibrous, carbonaceous material are preferably intertwined. The fibrous, carbonaceous material also preferably comprises carbon fibrils. The carbon fibrils preferably are discrete, cylindrical particles which are characterized by a substantially constant diameter between about 3.5 and about 70 nanometers and a length about 100 times their diameters. Their length is greater than about 100 times the diameter. They also have an outer region of multiple essentially continuous layers of ordered carbon atoms and a distinct inner core region. Each of the layers and the core is disposed substantially concentrically about the cylindrical axis of the fibril, and the entire fibril is substantially free of a thermal carbon overcoat. These carbon fibrils are used in an amount from 0.05 to 5.00 percent by weight of the entire composition. The white and/or other light colored pigment is used in an amount of from 20 to 70 percent by weight of the composition. The coating composition will preferably be electrostatically applied to a plastic or other low conductivity substrate. When this coating is used as a primer, it will be light colored and will have sufficient electrical conductivity to facilitate application of the topcoat by electrostatic spraying. In addition to being used as a primer, the coating composition of this invention can be advantageouly used to apply a finishing coating over a primer or directly over a substrate.

DETAILED DESCRIPTION

A preferred binder for use in the coating composition of the present invention comprises a saturated resin having pendent hydroxyl groups and an aminoplast curing agent. Examples of satisfactory resins are saturated polyesters, saturated polyurethanes and saturated polymers of ethylenically unsaturated monomers, all having hydroxyl functionality. Aromatic polymers, although being unsaturated in a strictly technical sense, fall within the term "saturated" as used herein because such saturation does not enter into free radical polymerization reactions.

Preferably this binder will be a resinous composition which comprises a polyol component containing at least 25 percent of a non-gelled polymeric polyol selected from the class, including mixtures thereof, consisting of polyester polyols, polyether polyols and polyurethane polyols, said non-gelled polymeric polyol having a hydroxyl value of less than 200 and a cured glass transition temperature less than 0° C.

One type of such resinous composition is further described in U.S. Pat. No. 4,154,891, the contents of which are incorporated herein by reference.

Another suitable binder for use in the coating composition of the present invention would be a polyepoxide and a polyacid curing agent as is disclosed in U.S. Pat. No. 4,737,403, the contents of which are incorporated herein by reference.

A light colored pigment is also be included in the coating composition of the present invention. Suitable light colored inorganic pigments would include titanium dioxide, zinc chromates, white lead, zinc oxide, zinc sulfide, antimony oxides, magnesium carbonate, calcium carbonate, calcium sulfate, barium sulfate, magnesium silicate, aluminum silicate, kaolinites, silicas and micas. It is believed that organic pigments, particularly the light colored yellows, could also be usefully employed in this composition.

Two or more light colored pigments may also be used together in the coating composition of the present invention. When two light colored pigments are used together in a primer, it may be particularly advantageous to use a white pigment and a pigment having a hue which is similar to the hue in the color of the finishing coat which will be applied over the primer coating of the present invention.

Typically, the total amount of white and/or other light colored pigment incorporated in the coating composition is in the amount of 20 to 70 percent by weight of the entire composition.

For the purpose of this description a light colored pigment would include a white colored pigment and would ordinarily be considered to have a color which has a Munsell value of 4.5 or more as is defined in the *ISCC-NBS Method of Designating Color* (Kelly 1955, 1976). Under that system, value is that quality of color which is described by the words light or dark and which relates the color to a gray of a similar lightness. Munsell value is a number from 0 to 10 with medium gray being from 4.5 to 6.5, light gray being from 6.5 to 8.5 and white being above 8.5. Dark gray and black would be below 4.5 to 2.0 and 2.0 to 0, respectively.

The fibers in the fibrous, carbonaceous material are preferably intertwined. The fibrous, carbonaceous material which is included in the coating composition of the present invention also preferably comprises carbon fibrils. For the purpose of this disclosure, carbon fibrils are carbon filaments with at least some graphitic domains which will normally be oriented with the c-axes of the graphite perpendicular to the fiber axis and which are prepared by contacting a metal catalyst with a carbon-containing gas. Examples of suitable carbon-containing gases would include ethylene, propylene, propane, methane, carbon monoxide, benzene, naphthalene, toluene and oxygenated hydrocarbons. A description of the crystal structure of graphite including its c-axis is included in *Encyclopedia of Chemical Technology*, Kirk-Othmer, 2nd Edition, Interscience, 1964, Vol. 4 pages 161 to 162, the contents of which are incorporated herein by reference. The carbon fibrils which are preferably used in the coating composition of the present invention are described in U.S. Pat. No. 4,663,230 and International Patent Application published under the Patent Cooperation Treaty (PCT) No. WO 89/07163 (dated Aug. 10, 1989), the contents of both of said references also being incorporated herein by reference. Essentially, such preferred carbon fibrils are characterized by a substantially constant diameter between about 3.5 and about 70 nanometers, e.g. between about 7 and 25 nanometers, length greater than about 100 times the diameter, an outer region of multiple essentially continuous layers of ordered carbon atoms and a distinct inner core region, each of the layers and core disposed substantially concentrically about the cylindrical axis of the fibril. Preferably, the entire fibril is substantially free of thermal carbon overcoat. The inner core of the fibril may be hollow or may contain carbon atoms which are less ordered than the ordered carbon atoms of the outer region, which are graphitic in nature.

When used as a primer, the coating composition may also contain optional ingredients such as plasticizers, flow control agents and other formulating additives. If these ingredients are present, they are usually present in amounts of up to 40 percent by weight based on total weight of the primer coating composition.

The present invention is particularly useful in coating compression molded and fiber-reinforced plastics and primarily the polyester variety which are known in the art as sheet molding compounds (SMC) or bulk molding compounds (BMC). Such materials are described in numerous publications and patents including the annually published *Modern Plastics Encyclopedia, The Encyclopedia of Chemical Technology*, Kirk-Othmer, 2nd edition, Vol. 20, pages 791–839, as well as U.S. Pat. No. 3,184,527. It is to be appreciated, however, that the coating of the present invention seems to be useful with other compression and injection molded plastics both thermosetting and thermoplastic, including, epoxides, phenolics, silicones, aminoplasts, polyurethanes, polyethylene, polystyrene, polypropylene, thermoplastic acrylics, polyvinyl chloride and various polymers and various copolymers of acrylonitrile and polybutadiene. In particular, it is believed that the coating of the present invention will be useful on reaction injection molded (RIM) plastics and thermoplastic elastomers (TPEs) including thermoplastic polyolefins (TPOs), which materials are described in the aforesaid *Modern Plastics Encyclopedia*. Also, fibers other than glass fibers, for example, boron fibers, may be used to reinforce the above mentioned plastics. It is also believed that the coating of the present invention will be useful as a primer or as a finish coating on other low conductivity substrates consisting of materials such as wood, glass and other ceramics, paper, textiles, fiberboard, plasterboard and particle board. For the purpose of this disclosure, such low conductivity substrates will, in general, be considered to have electrical resistance of more than 1,000 megaohms per inch (39,370 megaohms per meter) between surface points.

The coating composition can be applied to the substrate by any of the conventional coating techniques such as brushing, spraying, dipping or flowing, but it is preferred that spray application be used. Any of the known spray techniques may be employed such as compressed air spraying, electrostatic spraying, in either manual or automatic methods. If spraying is used, the viscosity of the primer coating composition should be adjusted with additional solvent if necessary such that it has a No. 4 Ford cup viscosity of 12–25 seconds, usually on the order of about 18 seconds at 75° F. (24° C.). The coating composition of the present invention is particularly advantageously applied by electrostatic spraying which is described, for example, in *Encyclopedia of Chemical Technology*, Kirk-Othmer, 3rd Edition, Wiley-Interscience, 1978, Vol. 6, pages 417 to 418 and *The Encyclopedia of Polymer Science and Technology*, Vol. 3, pages 797 to 801 and 825 to 826, the contents of both of said references being incorporated herein by reference. Essentially, in electrostatic spraying, particles of coating are electrically charged and the substrate to be coated is oppositely charged. The coating is sprayed toward the substrate, and because of this difference in charge the coating is attracted to the substrate. It will be understood that the coating composition of the present invention may be advantageously employed in electrostatically spraying a composition to apply either a primer coating directly over the substrate, a finishing coating directly over the primer coating or a single coating applied directly over the substrate. If sufficient fibrous, carbonaceous material is used so that the coating composition is, itself, electrically conductive, it is believed that the electrical charge applied to a coating composition being applied directly to a low conductivity substrate will tend to dissipate as soon as it is applied to the substrate and thereby reduce repulsion between the coating composition already applied to the substrate and charged particles of coating composition be sprayed toward the substrate.

After the coating composition has been applied to the substrate, the composition is heated to cure the coating. In the curing operation, the solvents are driven off, a substantially continuous coating is formed, and the coating is crosslinked. The heating operation is usually at low temperatures. Typically, temperatures from as low as 225° F. (107° C.) to as high as 325° F. (163° C.) can be used. However, the coating can be exposed to higher temperatures, as high as 400° F. (204° C.) without adverse effects. The time for curing is typically from about 15 to 60 minutes, more normally on the order of about 20 to 40 minutes. The thickness of the cured primer coating is typically from about 0.2 to 10 and preferably from about 0.5 to 2 mils.

After curing, the color of the coating should have a Munsell value of more than about 3.5 and preferably more than about 5.5. The coating should also have electrical resistance between two electrodes positioned at points on the surface of the coating of less than about 760 megaohms per inch (29,921.2 megaohms per meter) and preferably less than about 600 megaohms per inch (23,622 megaohms per meter) and more preferably less than about 190 megaohms per inch (7,480.3 megaohms per meter). The above mentioned three quantities of electrical resistance are equivalent, respectively, to readings of 105, 110 and 130 on the model no. 8333-00 sprayability meter available from the Ransburg Corporation of Indianapolis, Ind.

After the primer has been applied to the plastic substrate and cured, a finishing or topcoat may be applied directly to the primer coat. While the finishing coat may advantageously be the coating composition of the present invention, it can also be any of the compositions known in the art for automotive applications or which is otherwise known for coating plastics. These compositions comprise a resinous binder and a pigment. Particularly useful resinous binders are acrylic polymers, polyesters, including alkyds and polyurethanes.

The pigments useful in the finishing coat include color pigments normally used in automotive applications such as titanium dioxide, iron oxide, chromium oxide, lead chromate and carbon black, and organic pigments such as phthalocyanine blue and phthalocyanine green. If desired, metallic pigments such as aluminum flake and metal oxide encapsulated micas can also be used in the finishing coat. Typically, the pigment is incorporated in the coating composition in amounts of about 0.5 to 25 percent by weight based on total weight of the finishing coat. If desired, the finishing coat may additionally contain other materials such as flow control agents, anti-oxidants, U.V. light absorbers and the like. These optional ingredients are typically present in amounts of up to 25 percent by weight based on total resin solids. It is found that the use of the above described primer coating of the present invention allows the primer to be effectively hidden by the finishing coat.

The finishing coat can be applied to the primer by conventional means such as brushing, spraying, flow coating and the like, but they are most often applied by spraying. The usual spray techniques and equipment for air spraying, electrostatic spraying in either manual or automatic methods can be used. It is found that the conductive primer coating of the present invention will facilitate the application of the topcoat with electrostatic spray equipment.

After application of the finishing coat to the basecoat, it is heated to coalesce and cure the coating. In the coating operation, solvents are driven off, a substantially continuous coating is formed and the coating is crosslinked. Typically, heating is from 180° to 325° F. (82° to 163° C.) for about 15 to 60 minutes depending upon the resinous vehicle and curing agent which are present in the finishing coat. Film thicknesses for the finishing coat are typically on the order of 1 to 5 mils.

The finishing coat can be applied as a one-coat system or alternately can be applied as a so-called color-clear system in which the pigmented or colored basecoat is first applied to the primer followed by the application of a clear topcoat over the colored basecoat. Such systems are being increasingly used in the automotive industry since they provide for excellent depth of color in the underlying basecoat as well as outstanding gloss, distinctness of image and durability in the coating.

The invention is illustrated by reference to the following examples wherein parts are parts by weight unless otherwise indicated.

EXAMPLE A

A resin composition was made from the ingredients listed in Table 1 below.

TABLE 1

| Ingredient | Parts by Weight |
|---|---|
| Charge A | |
| Trimethylolpropane | 197.7 |
| Neopentyl glycol | 1211.9 |
| Water | 177.8 |
| Charge B | |
| Adipic acid | 181.7 |
| Tetrahydrophthalic anhydride | 1123.1 |
| Dibutyltin dilaurate | 2.7 |
| Water | 42.1 |
| Charge C | |
| Methylisobutyl ketone | 200 |
| Phosphoric acid (85% concentration) | 107.5 |
| Charge D | |
| Aromatic naphtha[1] | 650.3 |

[1]Available as SOLVESSO 100 from Exxon Corp.

Charge A was initially added to a reactor and melted. Charge B was then added and over a period of 6 hours was heated to 235° C. (455° F.) while the temperature at the top of the pack was held below 100° C. (212° F.). The reaction was terminated at an acid value of 3.0 and a Gardner-Holdt viscosity of X for an 80% solids solution in xylene. The product was cooled to 200° C. (392° F.) and vacuum was pulled to 3 mm./Hg to 160° C. (320° F.) for 15 minutes. The vacuum was broken with nitrogen. The methylisobutyl ketone was then added after which the rest of Charge C was added very slowly. The mixture was then heated to 160° C. (320° F.) and held at that temperature until an acid value of 26 was reached. All solvent was then stripped and the product was cooled and Charge D was added. The completed product had a viscosity of $Z_2$-$Z_3$, a Gardner-Holdt color of 3 and an acid value of 29.3. After heating for 30 minutes at 150° C. (302° F.), it had a solids content of 74.3%.

EXAMPLE B

A solvent blend was made by mixing the solvents shown in the following Table 2:

TABLE 2

| Ingredient | Parts by Weight |
|---|---|
| SOLVESSO 100 | 71.00 |
| Butyl acetate | 15.00 |
| Aromatic naphtha[2] | 7.00 |
| Butanol | 7.00 |
|  | 100.00 |

[2]Available as SOLVESSO 200 from Exxon Corp.

EXAMPLE C

A resin was made from the ingredients listed in the following Table 3.

TABLE 3

| Ingredient | Parts by Weight |
|---|---|
| Water | 221.0 |
| Neopentyl glycol | 2043.0 |
| Adipic acid | 930.0 |
| Isophthalic acid | 792.0 |
| Phthalic anhydride | 235.0 |
| Dibutyltin oxide | 1595.0 |
| SOLVESSO 100 | 539.0 |

All the ingredients except the SOLVESSO 100 were charged to a reactor and heated to 180° C. (356° F.) and held at that temperature for 30 minutes. The mixture was then heated to 200° C. (392° F.) and held at that temperature for 1 hour then heated to 220° C. (428° F.) and held at that temperature until an acid value of 2.9 was reached. The solvent was then added, and theoretical solids were 85%.

EXAMPLE D

A white paste was made from mixing the ingredients listed in Table 4 by premixing under high speed, stirring for 30 minutes and then grinding in a sand mill for 40 minutes.

TABLE 4

| Ingredient | Parts by Weight |
|---|---|
| Composition of Example A (74.2% solids) | 375.00 |
| Resin of Example C (80.0% solids) | 150.00 |
| Titanium dioxide | 395.00 |
| Silica | 5.00 |
| Silicone-free leveling agent[3] | 0.65 |
| Solvent blend of Example B | 74.35 |
|  | 1000.00 |

[3]Available as ADDITOL XL 480 from Hoechst Celanese Corp.

EXAMPLE E

A black paste was made by mixing the ingredients listed in Table 5:

TABLE 5

| Ingredient | Parts by Weight |
|---|---|
| Amine functional resin solution (35% by weight)[4] | 130.00 |
| Carbon fibrils[5] | 11.00 |
| Barium sulfate | 313.00 |
| Melamine-formaldehyde resin[6] | 330.00 |
| SOLVESSO 100 | 216.00 |
|  | 1000.00 |

[4]Available as EFKA 47 from Efka Chemical BV of Hillegom, the Netherlands.
[5]Available as BN-1000 graphite fibrils from Hyperion Catalysis International, Inc. of Lexington, Massachusetts.
[6]Available as CYMEL 303 from American Cyanamid Co.

EXAMPLE F

A solvent blend was made from a mixture of the ingredients listed on the following Table 6:

TABLE 6

| Ingredient | Parts by Weight |
|---|---|
| Xylene | 40.00 |
| Butyl acetate | 25.00 |
| Aromatic naphtha[7] | 35.00 |
|  | 100.00 |

[7]Available as SOLVESSO 200 from Exxon Corp.

EXAMPLE 1

A light gray conductive primer was made by mixing the ingredients listed in the following Table 7.

TABLE 7

| Ingredient | Parts by Weight |
|---|---|
| White paste of Example D | 768.16 |
| Black paste of Example E | 231.84 |
|  | 1000.00 |

The mixture was first thinned to No. 4 Ford Cup viscosity of 60 seconds with butyl acetate and subsequently thinned to a 30 seconds viscosity with the solvent solution of Example F. The resulting composition had the following characteristics:

| | |
|---|---|
| Solid content (spray viscosity) | 68–76% |
| Polyester ratio: A/C | 70/30 |
| Polyester/Melamine ratio | 80/20 |
| Pigment/Binder ratio | 50/50 |
| % carbon fibrils (by weight) | 0.335 |

This composition was electrostatically sprayed onto a panel formed from sheet molding compound (SCM) to a thickness of 2 to 2.5 mils. After it was cured for 30 minutes at 140° C. (284° F.), the cured coating had the following characteristics:

| | |
|---|---|
| Electrical resistance: | <190 megaohms per inch (<7,480.3 megaohms per meter) |
| Munsell value: | 7 |
| Thickness: | 1.5 to 2 mils |

What is claimed is:

1. A coating composition containing a resinous film forming binder, a fibrous, carbonaceous material and a light colored pigment wherein the carbonaceous material has a substantially constant diameter between about 3.5 and about 70 nanometers and lengths greater than about 100 times diameter and is present in an amount of from about 0.05 percent to about 5 percent by weight based on weight of the coating composition and the light colored pigment is present in an amount of from about 20 percent to about 70 percent by weight based on weight of the coating composition; said coating being further characterized such that when applied to a substrate and cured, the resultant coating is electrically conductive and has a Munsell value of more than 3.5.

2. The coating composition of claim 1 wherein the light colored pigment is of a color having a Munsell value of more than about 4.5.

3. The coating composition of claim 2 wherein the light colored pigment is of a color having a Munsell value of more than about 6.5.

4. The coating composition of claim 3 wherein the light colored pigment is white.

5. The coating composition of claim 1 wherein the light colored pigment is selected from the group consisting of titanium dioxide, zinc chromates, white lead, zinc oxide, zinc sulfide, antimony oxides, magnesium carbonate, calcium carbonate, calcium sulfate, barium sulfate, magnesium silicate, aluminum silicates, kaolinites, silicas and micas.

6. The coating composition of claim 1 wherein the fibrous, carbonaceous material comprises intertwined fibers.

7. The coating composition of claim 1 wherein the fibrous, carbonaceous material comprises carbon fibrils.

8. The coating composition of claim 7 wherein the carbon fibrils are essentially discrete and cylindrical and are characterized by a substantially constant diameter between about 3.5 and about 70 nanometers, length greater than about 100 times the diameter, an outer region of multiple essentially continuous layers of ordered carbon atoms and a distinct inner core region, each of the layers and core disposed substantially concentrically about the cylindrical axis of the fibril.

9. The coating composition of claim 8 wherein the cores of the carbon fibrils are hollow.

10. The coating composition of claim 8 wherein the inner core region of the fibrils comprises carbon atoms which are less ordered than the ordered carbon atoms of the outer region.

11. The coating composition of claim 8 wherein the ordered carbon atoms of the fibrils are graphitic.

12. The coating composition of claim 8 wherein the diameter of the fibrils is between about 7 and 25 nanometers.

13. The coating composition of claim 8 wherein the inner core region of the fibrils has a diameter greater than about 2 nanometers.

14. The coating composition of claim 1 which is electrically conductive.

15. The coating composition of claim 1 such that the resultant coating has an electrical resistance of less than 760 megaohms per inch (29,921.2 megaohms per meter).

* * * * *